US009777119B2

(12) United States Patent
Weber et al.

(10) Patent No.: US 9,777,119 B2
(45) Date of Patent: Oct. 3, 2017

(54) POLYARYLETHER SULFONE POLYMERS (P) WITH A REDUCED SOLVENT CONTENT

(71) Applicant: BASF SE, Ludwigshafen (DE)

(72) Inventors: Martin Weber, Maikammer (DE); Christian Maletzko, Altrip (DE); Bastiaan Bram Pieter Staal, Limburgerhof (DE); Joerg Erbes, Karlsruhe (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/900,328

(22) PCT Filed: Jun. 26, 2014

(86) PCT No.: PCT/EP2014/063519
§ 371 (c)(1),
(2) Date: Dec. 21, 2015

(87) PCT Pub. No.: WO2014/207106
PCT Pub. Date: Dec. 31, 2014

(65) Prior Publication Data
US 2016/0152776 A1 Jun. 2, 2016

(30) Foreign Application Priority Data
Jun. 28, 2013 (EP) .................................... 13174348

(51) Int. Cl.
*C08G 8/02* (2006.01)
*C08G 75/23* (2006.01)
*C08G 75/00* (2006.01)

(52) U.S. Cl.
CPC ............. *C08G 75/23* (2013.01); *C08G 75/00* (2013.01)

(58) Field of Classification Search
CPC .................. C08G 75/23; C08G 75/20; C08G 2261/3444; C08L 81/06
See application file for complete search history.

(56) References Cited

U.S. PATENT DOCUMENTS

| 4,200,728 | A | 4/1980 | Blinne et al. |
| 5,013,816 | A | 5/1991 | Bobbink et al. |
| 5,126,427 | A | 6/1992 | Pfaendner et al. |
| 6,228,970 | B1 | 5/2001 | Savariar |
| 6,407,157 | B2 | 6/2002 | Oyamada et al. |
| 6,593,445 | B2 | 7/2003 | Schwab |
| 8,716,381 | B2 | 5/2014 | Mettlach et al. |
| 8,729,164 | B2 | 5/2014 | Hennenberger et al. |
| 8,889,769 | B2 | 11/2014 | Weber et al. |
| 8,952,109 | B2 | 2/2015 | Weber et al. |
| 9,102,798 | B2 | 8/2015 | Weber et al. |
| 9,120,062 | B2 | 9/2015 | Weber et al. |
| 9,127,160 | B2 | 9/2015 | Weber et al. |
| 9,199,205 | B2 | 12/2015 | Weber et al. |
| 2008/0085990 | A1* | 4/2008 | Richter ................ C08G 65/46 528/126 |
| 2012/0029106 | A1* | 2/2012 | Weber .................... C08G 75/23 521/180 |
| 2013/0059933 | A1 | 3/2013 | Ruckdaschel et al. |
| 2013/0085224 | A1 | 4/2013 | Weber et al. |
| 2013/0255785 | A1 | 10/2013 | Schmid et al. |
| 2013/0341273 | A1 | 12/2013 | Weber et al. |
| 2014/0183028 | A1 | 7/2014 | Sigwart et al. |
| 2014/0183029 | A1 | 7/2014 | Erbes et al. |
| 2014/0183030 | A1 | 7/2014 | Sigwart et al. |
| 2014/0183031 | A1 | 7/2014 | Sigwart et al. |
| 2014/0183032 | A1 | 7/2014 | Sigwart et al. |
| 2014/0187737 | A1 | 7/2014 | Erbes et al. |
| 2014/0187796 | A1 | 7/2014 | Sigwart et al. |
| 2014/0272565 | A1 | 9/2014 | Gronwald et al. |
| 2016/0002411 | A1 | 1/2016 | Menozzi et al. |

FOREIGN PATENT DOCUMENTS

| DE | 1957 091 | 6/1970 |
| DE | 3644464 | 7/1988 |
| DE | 42 16 588 | 11/1993 |
| DE | 101 17 715 | 11/2001 |
| EP | 0 000 361 | 1/1979 |
| EP | 0 274 098 | 7/1988 |
| EP | 0 447 358 | 9/1991 |
| EP | 2 305 740 | 4/2011 |
| WO | 00 18824 | 4/2000 |
| WO | 01 66620 | 9/2001 |
| WO | 2011 020823 | 2/2011 |

OTHER PUBLICATIONS

Gaechter et al., "Taschenbuch der Kunststoffadditive," Plastics Additives Handbook, (1983), pp. 494-519.
International Search Report Issued Jul. 25, 2014 in PCT/EP14/063519 Filed Jun. 26, 2014.
International Preliminary Report on Patentability issued Dec. 30, 2015 in PCT/EP2014/063519 filed Jun. 26, 2014 (submitting English translation only).

* cited by examiner

Primary Examiner — Shane Fang
(74) Attorney, Agent, or Firm — Oblon, McClelland, Maier & Neustadt, L.L.P.

(57) ABSTRACT

The present invention relates to a process for the production of a polyaryl ether sulfone polymer (P), comprising the following steps:
(I) provision of a solution (PL) which comprises the polyaryl ether sulfone polymer (P) and comprises an aprotic polar solvent (L),
(II) separation of the solution (PL) into droplets,
(III) transfer of the droplets into a precipitation bath (F) which comprises water, with the result that the polyaryl ether sulfone polymer (P) is obtained in the form of particles, and
(IV) isolation of the polyaryl ether sulfone polymer (P) where the temperature of the solution (PL) in step (II) is in the range from 50 to <80° C.

15 Claims, No Drawings

POLYARYLETHER SULFONE POLYMERS (P) WITH A REDUCED SOLVENT CONTENT

The present invention relates to a process for the production of a polyaryl ether sulfone polymer (P) with reduced solvent content, to the polyaryl ether sulfone polymers (P) obtainable by said process, to thermoplastic molding compositions which comprise the polyaryl ether sulfone polymer (P), and also to moldings which are produced from the molding compositions.

Polyaryl ether sulfone polymers (P) are classified as high-performance thermoplastics and feature high heat resistance, good mechanical properties and inherent flame retardancy.

The production process for polyaryl ether sulfone polymers (P) has been known for a long time. This production process for polyaryl ether sulfone polymers (P) generally proceeds via polycondensation of appropriate aromatic dihydroxy compounds with aromatic dihalogen compounds, this polycondensation being carried out in an aprotic polar solvent in the presence of potassium carbonate as base. The form in which the polyaryl ether sulfone polymers (P) are produced in the process is therefore that of a solution, which comprises the polyaryl ether sulfone polymer (P) dissolved in the aprotic polar solvent. The prior art describes various methods for the isolation of the polyaryl ether sulfone polymer (P) from the aprotic polar solvent.

DE 1 957 091 describes a process for the production of polyaryl ether sulfone polymers (P) by using, as aprotic polar solvents, dimethyl sulfoxide, diethyl sulfoxide, tetramethylene sulfoxide, diphenyl sulfone, dimethyl sulfone, diethyl sulfone, diisopropyl sulfone, hexamethylphosphoramide, diethylene glycol, dimethylacetamide, dimethylformamide or nitrobenzene. Once polycondensation is complete, the resultant polymer solution is first cooled to room temperature. For the isolation of the polyaryl ether sulfone polymer (P), said polymer solution is then slowly added to boiling water in order to precipitate the polymer. The precipitated polymer is then isolated by filtration and dried.

EP 0 000 361 likewise describes a process for the production of polyaryl ether sulfone polymers (P) where N,N-dimethylformamide, N,N-dimethylacetamide, N-methylpyrrolidone, dimethyl sulfoxide, dimethyl sulfone, sulfolane or diphenyl sulfone is used as aprotic polar solvent. For the isolation of the polyaryl ether sulfone polymer (P) from the polymer solution obtained during the polycondensation, inorganic constituents are first removed by filtration from the polymer solution. The polymer solution is then precipitated in water. The precipitated polymer is isolated by filtration and then dried at 80° C. in vacuo.

WO 00/18824 also describes a process for the production of polyaryl ether sulfone polymers (P). For the isolation of the polymer, the resultant polymer solution is slowly added to a mixture of methanol and water in the ratio 70:30. The methanol-water solution is rapidly stirred here. The resultant polymer precipitate is then isolated by filtration and washed with methanol and water. The polymer precipitate is then dried in vacuo.

WO 01/066620 also describes a process for the production of polyaryl ether sulfone polymers (P). Sulfolane is used as aprotic polar solvent. The polyaryl ether sulfone polymer (P) is isolated from the resultant polymer solution by adding the polymer solution slowly to a cooled solution of methanol and water in the ratio 70:30. The methanol-water solution is stirred at high speeds here. The resultant precipitate is then isolated by filtration and dried in vacuo.

WO 2011/020 823 discloses a process for the production of polybiphenyl sulfone polymers in a polar aprotic solvent. An aromatic dihalogen sulfone compound is reacted here with an excess of an aromatic dihydroxy compound. During or after the reaction a metal hydroxide is added. Preferred polar aprotic solvent is N-methylpyrrolidone. To isolate the polybiphenyl sulfone polymer from the polymer solution obtained, the solution is first filtered and the polymer is then precipitated in an NMP/water mixture.

The processes described above give polyaryl ether sulfone polymers (P) in undefined form. The addition of the polymer solution to water or to a water-methanol mixture causes uncontrolled precipitation of the polyaryl ether sulfone polymer (P) comprised in the polymer solution. Polymer precipitates that form therefore take the form of undefined agglomerates. Said polymer agglomerates are unsuitable for further processing, for example, to give molding compositions or moldings. Furthermore, the resultant polyaryl ether sulfone polymers (P) comprise relatively large amounts of aprotic polar solvent. These aprotic polar solvents are therefore also comprised in moldings produced from the polyaryl ether sulfone polymers (P) obtainable by the processes described above. The aprotic polar solvents can migrate out of the moldings during use thereof. The resultant moldings could therefore be toxicologically hazardous. These moldings are in particular often unsuitable for food-and-drink applications.

DE 3 644 464 describes a process for the isolation of particulate polyaryl ether sulfone polymers (P), in order to avoid undefined polymer agglomerates. In a first step of this process aromatic dihydroxy compounds are polycondensed with aromatic dihalogen compounds in an aprotic polar solvent. This polycondensation preferably takes place in anhydrous N-methylpyrrolidone in the presence of potassium carbonate. The polymer solution obtained by the process according to DE 3 644 464 is then divided via a nozzle into a large number of liquid jets. From these liquid jets, a large number of relatively uniform large droplets is produced via jet disintegration. These droplets are then transferred to a precipitation bath in which the polyaryl ether sulfone polymer (P) is formed as particles, i.e. as beads. The precipitation bath (precipitant) used here comprises water or a mixture of water and alcohols, such as methanol, ethanol or pentanol. The resultant polyaryl ether sulfone polymer (P) beads are then isolated by filtration and dried. Although the polyaryl ether sulfone polymers (P) obtained according to DE 3 644 464 have a relatively definite particle size distribution, and are therefore suitable for further processing to give molding compositions or to give moldings, the polyaryl ether sulfone polymers (P) likewise comprise relatively large amounts of aprotic polar solvents. The moldings produced from the polyaryl ether sulfone polymers (P) according to DE 3 644 464 are therefore sometimes unsuitable in particular for applications in the food-and-drink sector.

EP 2305740 also describes a process for the production of polyaryl ether sulfone polymers (P) in the form of particles. The polycondensation here is carried out in N-methylpyrrolidone, N-ethylpyrrolidone, dimethylformamide, dimethyl sulfoxide, 1,2-dichlorobenzene, sulfolane or hexamethylphosphoramide. The polymer solution obtained during the polycondensation, comprising polyaryl ether sulfone polymer (P) and aprotic polar solvent, is then subjected to a separation step for the formation of droplets. The resultant droplets are then transferred to a moving precipitation bath for the formation of polymer particles. Polymer particles with a diameter in the range from 0.5 to 4 mm are thus obtained. The precipitation bath used comprises water and/or monohydric or dihydric aliphatic alcohols having from 1 to 6 carbon atoms. During the separation step, temperatures of the polymer solution are high, particular preference being given here to temperatures in the range from 150 to 220° C. According to the teaching of EP 2 305 740, the water temperature of the precipitation bath must moreover be at least 80° C. The polyaryl ether sulfone polymer (P) particles obtained according to EP 2 305 740 are then isolated, for example, by filtration. Again, the polyaryl ether sulfone polymers (P) obtained according to EP 2 305 740 comprise relatively large amounts of aprotic polar solvents. The polyaryl ether sulfone polymers (P) obtained according to EP 2 305 740 are therefore unsuitable for the production of moldings, in particular for food-and-drink applications.

The present invention is therefore based on the object of providing a process which can produce polyaryl ether sulfone polymers (P) which provides access to polyaryl ether sulfone polymers (P) which have reduced content of aprotic polar solvents. The polyaryl ether sulfone polymers (P) are also intended to be suitable for the production of moldings for food-and-drink applications. The process of the invention and the polyaryl ether sulfone polymers (P) obtainable thereby are intended to avoid the disadvantages of the processes described in the prior art and the polymers obtainable therefrom, or to have said disadvantages only to a reduced extent. The intention is that it be possible to carry out this process of the invention in a simple and inexpensive manner, with minimized susceptibility to defects.

This invention achieves this object via a process for the production of a polyaryl ether sulfone polymer (P) comprising the following steps:
(I) provision of a solution (PL) which comprises the polyaryl ether sulfone polymer (P) and comprises an aprotic polar solvent (L),
(II) separation of the solution (PL) into droplets,
(III) transfer of the droplets into a precipitation bath (F) which comprises water, with the result that the polyaryl ether sulfone polymer (P) is obtained in the form of particles, and
(IV) isolation of the polyaryl ether sulfone polymer (P)
where the temperature of the solution (PL) in step (II) is in the range from 50 to <80° C.

Surprisingly, it has been found that the process of the invention gives polyaryl ether sulfone polymers (P) which have markedly reduced content of aprotic polar solvent (L) in comparison with the polyaryl ether sulfone polymers (P) described in the prior art. The polyaryl ether sulfone polymers (P) obtainable by the process of the invention have only residual amounts of aprotic polar solvent (L) in the range from 10 to 300 ppm by weight, based on the total weight of the polyaryl ether sulfone polymer (P) obtained in the process. This is surprising because products obtainable commercially sometimes have a residual content of aprotic polar solvent in the region of 2000 ppm by weight.

(I) Provision of the Solution (PL)

The provision of a solution (PL) which comprises the polyaryl ether sulfone polymer (P) and an aprotic polar solvent (L) can be achieved in various ways and is known per se to the person skilled in the art. In one embodiment, a preceding step can be used to produce and isolate the polyaryl ether sulfone polymer (P). The isolated polyaryl ether sulfone polymer (P) can then be dissolved in an aprotic polar solvent (L) in order to provide the solution (PL). In this embodiment, the process of the invention therefore represents a purification process which produces polyaryl ether sulfone polymers (P) having reduced content of aprotic polar solvent. It is also possible to produce, according to step (I), a polyaryl ether sulfone polymer (P) by polycondensation in an aprotic polar solvent (L). In this embodiment, according to step (I) the polyaryl ether sulfone polymer (P) is produced by polycondensation in an aprotic polar solvent (L) in the presence of a carbonate compound (C), and this polycondensation directly gives a solution (PL) which comprises the polyaryl ether sulfone polymer (P) and an aprotic polar solvent (L). This variant is preferred.

The expression "polyaryl ether sulfone polymer (P)" in the invention means precisely one polyaryl ether sulfone polymer (P) and also mixtures of two or more polyaryl ether sulfone polymers (P). The same applies to the expression an "aprotic polar solvent (L)". This likewise means precisely one aprotic polar solvent (L) and also mixtures of two or more aprotic polar solvents (L).

In one preferred embodiment, the provision of the solution (PL) according to step (I) comprises:
(i) the reaction of a component (a1), composed of at least one aromatic dihydroxy compound, and of component (a2), composed of at least one aromatic sulfone compound having two halogen substituents, where component (a1) comprises 4,4'-dihydroxybiphenyl and where the molar ratio of components (a1) to (a2) is in the range from 1.005 to 1.2, and where the reaction is carried out in an aprotic polar solvent (L) in the presence of a carbonate compound (C), with the result that the solution (PL) is obtained.

In said embodiment, step (I) gives the solution (PL) directly. This can then be separated, according to step (II), into droplets. In one preferred embodiment, the inorganic salts formed during the polycondensation are removed from the solution (PL) obtained according to step (i) prior to step (II). In the event that the solution (PL) still comprises carbonate compound (C) after the polycondensation, this is preferably likewise removed. This can be achieved by way of example by filtration. During the polycondensation the corresponding metal halides are formed from the carbonate compound (C).

The present invention therefore also provides a process in which, prior to the separation according to step (II), the solution (PL) obtained according to step (i) is subjected to filtration.

In said embodiment, component (a1) comprises 4,4'-dihydroxybiphenyl. In this embodiment, polyaryl ether sulfone polymer obtained comprises a polybiphenyl sulfone polymer (P1). The expression polybiphenyl sulfone polymer (P1) in the invention means polyaryl ether sulfones which comprise 4,4'-dihydroxybiphenyl as monomer unit. The expression polybiphenyl sulfone polymer (P1) therefore comprises inter alia polybiphenyl sulfone homo- and copolymers. A polybiphenyl sulfone polymer (P1) which is composed exclusively of the monomer units 4,4'-dihalodiphenyl sulfone and 4,4'-dihydroxybiphenyl is termed polybiphenyl sulfone (PPSU).

For the purposes of the present invention, the polybiphenyl sulfone polymers (P1) are characterized with reference to the monomer units used. It is obvious to the person skilled in the art that the monomer units are present in reacted form in the polymer, and that the reaction of the monomer units takes place via nucleophilic aromatic polycondensation with, according to calculation, elimination of one unit of hydrogen halide as leaving group. The structure of the resultant polymer is therefore independent of the precise nature of the leaving group.

Component (a1) in the invention is composed of at least one aromatic dihydroxy compound and comprises 4,4'- dihydroxybiphenyl. Component (a1) can moreover in particular comprise the following compounds:

- dihydroxybenzenes, in particular hydroquinone and resorcinol;
- dihydroxynaphthalenes, in particular 1,5-dihydroxynaphthalene, 1,6-dihydroxynaphthalene, 1,7-dihydroxynaphthalene, and 2,7-dihydroxynaphthalene;
- dihydroxybiphenyls other than 4,4'-biphenol, in particular 2,2'-biphenol;
- bisphenyl ethers, in particular bis(4-hydroxyphenyl)ether and bis(2-hydroxyphenyl)ether;
- bisphenylpropanes, in particular 2,2-bis(4-hydroxyphenyl)propane, 2,2-bis(3-methyl-4-hydroxyphenyl)propane, and 2,2-bis(3,5-dimethyl-4-hydroxyphenyl)propane;
- bisphenylmethanes, in particular bis(4-hydroxyphenyl)methane;
- bisphenylcyclohexanes, in particular bis(4-hydroxyphenyl)-2,2,4-tri-methylcyclohexane;
- bisphenyl sulfones, in particular bis(4-hydroxyphenyl)sulfone;
- bisphenyl sulfides, in particular bis(4-hydroxyphenyl)sulfide;
- bisphenyl ketones, in particular bis(4-hydroxyphenyl)ketone;
- bisphenylhexafluoropropanes, in particular 2,2-bis(3,5-dimethyl-4-hydroxyphenyl)hexafluoropropane; and
- bisphenylfluorenes, in particular 9,9-bis(4-hydroxyphenyl)fluorene.

Component (a1) preferably comprises at least 50% by weight, more preferably comprises at least 60% by weight, particularly preferably comprises at least 80% by weight and in particular comprises at least 95% by weight of 4,4'-dihydroxybiphenyl, based in each case on the total weight of component (a1). It is very particularly preferable that component (a1) is composed of 4,4'-dihydroxybiphenyl.

Suitable aromatic sulfone compounds having two halogen substituents and suitable as component (a2) are known in principle to the person skilled in the art. Preferred components (a2) are in particular dihalodiphenyl sulfones such as 4,4'-dichlorodiphenyl sulfone, 4,4'-difluorodiphenyl sulfone, 4,4'-dibromodiphenyl sulfone, 2,2'-dichlorodiphenyl sulfone and 2,2'-difluorodiphenyl sulfone. Particular preference is given to 4,4'-dichlorodiphenyl sulfone and 4,4'-difluorodiphenyl sulfone. Very particular preference is given to 4,4'-dichlorodiphenyl sulfone.

Particular preference is given to the reaction of 4,4'-dihydroxybiphenyl as component (a1) and 4,4'-dihalodiphenyl sulfone as component (a2), giving polybiphenyl sulfone polymer (P1) (PPSU) as product.

According to step (i) of the present invention, the provision of the solution (PL) comprises the reaction of component (a2) with a molar excess of component (a1) in an aprotic polar solvent (L).

The reaction of components (a1) and (a2) to give a polyaryl ether sulfone polymer (P), preferably to give a polybiphenyl sulfone polymer (P1), is known per se to the person skilled in the art in respect of the temperature, the aprotic polar solvent (L) and the time required. The reaction of the starting compounds (a1) and (a2) is carried out at a temperature of from 80 to 250° C., preferably from 100 to 220° C., and the upper limit of the temperature here results from the boiling point of the solvent. The reaction preferably takes place within a period of from 2 to 12 h, in particular from 3 to 8 h.

The molar ratio of components (a1) to (a2) is preferably from 1.005 to 1.2, in particular from 1.005 to 1.1. In one particularly preferred embodiment, the molar ratio of components (a1) to (a2) is from 1.005 to 1.08, in particular from 1.01 to 1.05, very particularly preferably from 1.015 to 1.04. This can be a particularly effective way of controlling the molecular weight, with a simultaneous advantageous effect on the resultant content of polymer-bonded chlorine.

The expression "reaction of components (a1) and (a2)" means the polycondensation to form a polyaryl ether sulfone polymer (P), preferably a polybiphenyl sulfone polymer (P1).

According to step (i) of the present invention, the reaction of components (a1) and (a2) takes place in an aprotic polar solvent (L). Suitable solvents here have a boiling point in the range from 80 to 320° C., in particular from 100 to 280° C., preferably from 150 to 250° C. Suitable aprotic polar solvents (L) are in particular high-boiling point ethers, esters, ketones, asymmetrically halogenated hydrocarbons, anisole, dimethylformamide, dimethyl sulfoxide, sulfolane, N-ethyl-2-pyrrolidone and N-methyl-2-pyrrolidone (N-methylpyrrolidone, NMP) and mixtures of the abovementioned solvents. Other terms used for sulfolane are tetrahydrothiophene 1,1-dioxide and tetramethylene sulfone.

Preferred aprotic polar solvents (L) are selected from the group consisting of anisole, dimethylformamide, dimethyl sulfoxide, sulfolane, N-ethyl-2-pyrrolidone and N-methyl-2-pyrrolidone (N-methylpyrrolidone, NMP) and mixtures of these.

Aprotic polar solvents (L) to which more preference is given are selected from the group consisting of dimethyl sulfoxide, sulfolane, N-ethyl-2-pyrrolidone and N-methyl-2-pyrrolidone (N-methylpyrrolidone, NMP) and mixtures of these.

Particularly preferred aprotic polar solvents (L) are selected from the group consisting of sulfolane and N-methyl-2-pyrrolidone (N-methylpyrrolidone, NMP) and mixtures of these.

Aprotic polar solvents (L) that are in particular preferred are selected from the group consisting of sulfolane and N-methyl-2-pyrrolidone (N-methylpyrrolidone, NMP) and mixtures of these.

Sulfolane is most preferred.

The statements and preferences above relating to the aprotic polar solvent (L) apply correspondingly to the solution (PL) and the polyaryl ether sulfone polymer (P).

The present invention therefore also provides a process in which the aprotic polar solvent (L) is at least one solvent with a boiling point in the range from 100 to 280° C., selected from the group consisting of ethers, esters, ketones, asymmetrically halogenated hydrocarbons, anisole, dimethylformamide, dimethyl sulfoxide, N-ethyl-2-pyrrolidone, N-methyl-2-pyrrolidone, and tetrahydrothiophene 1,1-dioxide.

Surprisingly, it has been found that a particularly low content of polymer-bonded chlorine is observed when aprotic polar solvent (L) used is one comprising N-methylpyrrolidone or comprising sulfolane. Very particular preference is given to N-methylpyrrolidone or sulfolane as solvent. N-Methylpyrrolidone or sulfolane simultaneously contribute to high conversion of components (a1) and (a2), since the reaction of the monomers used in the invention proceeds particularly efficiently.

The reaction of components (a1) and (a2) preferably takes place in the presence of a carbonate compound (C), in order to increase reactivity with respect to the halogen substituents of the starting compounds (a2). It is preferable, starting from the abovementioned aromatic dihydroxy compounds (a1), to add a carbonate compound (C) so as to produce the dipotassium or disodium salts of said compounds, and to react said salts with component (a1). Suitable carbonate compounds (C) are known to the person skilled in the art.

Preferred carbonate compounds (C) are alkali metal carbonates. The combination of the use of alkali metal carbonates and the process conducted according to the claims leads to particularly advantageous properties in relation to intrinsic color, mechanical properties, and content of polymer-bonded chlorine, and content of aprotic polar solvent (L).

The carbonate compounds (C) are preferably anhydrous. Suitable carbonate compounds (C) are in particular anhydrous alkali metal carbonate, preferably sodium carbonate, potassium carbonate or mixtures thereof, and very particular preference is given here to potassium carbonate, in particular potassium carbonate with a volume-average particle size of less than 120 micrometers, in a suspension in a chlorobenzene/sulfolane mixture (60/40 parts by weight) by using particle size measurement equipment.

It has moreover proven to be advantageous in the context of step (i) to establish the amount of the polybiphenyl sulfone polymer (P1), based on the total weight of the solution (PL), at from 10 to 70% by weight, preferably from 10 to 35% by weight.

In one preferred embodiment, the reaction according to step (i) is carried out in the presence of at least one aromatic organic monochloro compound as component (a3).

It is believed that the aromatic organic monochloro compound functions as chain transfer agent. It is preferable that the reactivity of the aromatic organic monochloro compound is, for the purposes of the reaction in step (i), similar to that of component (a2).

It is preferable that component (a3) is an aromatic monochloro sulfone, in particular monochloro diphenyl sulfone. In one preferred embodiment, the excess of component (a1) is compensated by the organic monochloro compound (a3), which comprises a chloro group that is reactive under the conditions of the reaction of components (a1) and (a2).

In another preferred embodiment, the reaction according to step (i) is followed by, according to step (ii), a further reaction with at least one aliphatic organic halogen compound. Reactive terminal hydroxy groups of the polyaryl ether sulfone polymer (P) obtained according to step (i) are thus further reacted, and an increase in the size of the polymer chain on subsequent exposure to thermal stress is thus prevented.

Preferred aliphatic organic halogen compounds are alkyl halides, in particular alkyl chlorides, having linear or branched alkyl groups having from 1 to 10 carbon atoms, in particular primary alkyl chlorides, particularly preferably methyl halides, in particular methyl chloride.

The reaction according to step (ii) is preferably carried out at a temperature of from 90° to 160° C., in particular from 100° C. to 150° C. The time required can vary over a wide range of times, and is usually at least 5 minutes, in particular at least 15 minutes. It is preferable that the time required for the reaction according to step (ii) is from 15 minutes to 8 hours, in particular from 30 minutes to 4 hours.

Various methods can be used for the addition of the aliphatic organic halogen compound. It is moreover possible to add a stoichiometric amount or an excess of the aliphatic organic halogen compound, and the excess here can by way of example by up to 5-fold. In one preferred embodiment, the aliphatic organic halogen compound is added continuously, in particular via continuous introduction in the form of a gas stream.

The present invention thus also provides a process for the production of polyaryl ether sulfone polymers (P) in which the provision of the solution (PL) according to step (I) comprises the following steps:
(i) the reaction of a component (a1), composed of at least one aromatic dihydroxy compound, and of component (a2), composed of at least one aromatic sulfone compound having two halogen substituents, where component (a1) comprises 4,4'-dihydroxybiphenyl and where the molar ratio of components (a1) to (a2) is in the range from 1.005 to 1.2, and where the reaction is carried out in an aprotic polar solvent (L) in the presence of a carbonate compound (C), with the result that a polymer (Pr) is obtained, and
(ii) reaction of the polymer (Pr) with an alkyl chloride, with the result that the solution (PL) is obtained.

It has proven advantageous to filter the solution (PL) after step (i) and respectively step (ii). The salt content formed during the polycondensation is thus removed, as also is any gel that may have been formed.

The present invention also provides a process in which the provision of the polymer solution (PL) also comprises a filtration step as step (iii).

The solution (PL) provided in step (i) preferably comprises from 10 to 35% by weight, with preference from 15 to 30% by weight of the polyaryl ether sulfone polymer (P), based on the total weight of the solution (PL).

The present invention therefore also provides a process in which the solution (PL) comprises from 10 to 35% by weight of the polyaryl ether sulfone polymer (P), based on the total weight of the solution (PL).

The content of the polyaryl ether sulfone polymer (P) can, as described above, be established by dissolution, in an aprotic polar solvent (L), of a polyaryl ether sulfone polymer (P) which has been produced in a preceding step. However, it is preferable that the content of polyaryl ether sulfone polymer (P) in the solution (PL) is established according to step (i), (ii) and, respectively, (iii). The solution (PL) obtained in this production process can directly comprise the content described above of polyaryl ether sulfone polymer (P) here. However, it is also possible according to step (i), (ii) and, respectively, (iii) to begin by producing a solution (PL) which comprises a higher content of polyaryl ether sulfone polymer (P). In this event, the solution (PL) is diluted via addition of further aprotic polar solvent (L) in order to establish the concentration described above.

The solution (PL) used in step (II) can optionally comprise other substances alongside the aprotic polar solvent (L) and the polyaryl ether sulfone polymer (P). However, it is preferable that the solution consists essentially of the aprotic polar solvent (L) and of the polyaryl ether sulfone polymer (P). The expression "consists essentially of" means in the invention that the solution (PL) comprises at most 5% by weight, preferably at most 3% by weight, particularly preferably at most 1% by weight and with particular preference at most 0.5% by weight, of other substances, where the by weight data are in each case based on the total weight of the solution (PL).

The term "aprotic" in the invention means that the solvents (L) used have no functional groups from which a proton ($H^+$) can be cleaved.

The term "polar" in the invention means solvents with electrostatic factor greater than $200*10^{-30}$ Cm. The electrostatic factor (also referred to as EF) is defined as the product of the relative dielectric constant $\in_r$ and the dipole moment μ (see for example C. Reichardt "Solvents and Solvent Effects in Organic Chemistry" 4th edition, Wiley-VCH Verlag GmbH & Co. KG, Weinheim 2011, Chapter 3.2, p. 81)

The temperature of the solution (PL) in step (II) is in the range from 50 to <80° C. In one embodiment, this temperature is already established in step (I), and the temperature of the solution (PL) at the end of step (I) is therefore likewise in the range from 50 to <80° C. To this end, it is possible by way of example to use a thermostat to control the temperature of the solution (PL). If the provision of the solution (PL) is carried out according to process variant (i), (ii) and, respectively, (iii), it is also possible by way of example to establish the temperature via addition of further aprotic polar solvent (L).

(II) Separation of the Solution (PL) into Droplets

In step (II), the solution (PL) provided according to step (I) is separated into droplets. The separation of solutions into droplets is in principle known to the person skilled in the art. Any of the known processes for the production of droplets from a solution can be used for this purpose. In step (II) of the process of the invention, the main decisive factor is the temperature of the solution (PL). A secondary decisive factor is the concentration of the polyaryl ether sulfone polymer (P) in the solution (PL).

In step (II), the solution (PL) preferably comprises from 15 to 35% by weight, with preference from 15 to 30% by weight, of the polyaryl ether sulfone polymer (P), based on the total weight of the solution (PL).

The temperature of the solution (PL) in step (II) is generally in the range from 50 to <80° C., preferably in the range from 50 to 79° C., particularly preferably in the range from 50 to 78° C. and in particular in the range from 50 to 75° C.

It is preferable that the separation of the solution (PL) into droplets according to step (II) takes place via jet disintegration. This technology is known in principle and is described by way of example in EP 2 305 740 and DE 36 44 464.

In one preferred embodiment, the solution (PL) in step (ii) is introduced into at least one nozzle. The solution (PL) is discharged from said nozzle in the form of a jet of liquid. From said jet of liquid, droplets of uniform size are formed by disintegration of the jet. This can, by way of example, be achieved via provision of an adequate path length between the discharge of the jet of liquid from the nozzle and entry into the precipitation bath (F) in step (III). After discharge of the solution (PL) from the nozzle in the form of a jet of liquid, and after a certain path length has been traversed, waves are formed and lead to the disintegration of the jet of liquid into equal-size droplets. This process is also termed jet disintegration. Another possible technical method is controlled jet disintegration. For this, the nozzle is caused to oscillate or the solution (PL) is caused to oscillate and is passed through a fixed nozzle. The nozzle can be caused to oscillate longitudinally or transversely. Longitudinal oscillations can be produced by way of example by securing the nozzle on a membrane. Said membrane is caused to oscillate longitudinally by way of an oscillator with the aid of a tone generator. It is also possible to use a piezoelectric transducer instead of the tone generator. Transverse oscillations are generally produced by using vibrators. Another way of achieving jet disintegration is pulsing of the liquid in a fixed nozzle, for example, via an oscillator. In this case, the solution (PL) passes through a vibration chamber driven by an oscillator, and disintegrates during discharge from the nozzle.

The frequency of the oscillations or vibrations is generally in the range from 30 to 1000 s$^{-1}$, preferably in the range from 50 to 800 s$^{-1}$. By using periodic perturbations of this type it is possible to shorten the path length between the discharge of the solution (PL) from the nozzle and entry into the precipitation bath (F) without impairing droplet size uniformity. This makes it possible to achieve wide variation of the path length (=drop height) between discharge from the nozzle and entry into the precipitation bath (F).

The drop heights are generally in the range from 0.1 to 10 m, preferably from 0.1 to 2 m, with particular preference in the range from 0.2 to 1.5 m. It is self-evident that step (II) can use precisely one nozzle, but it is also possible to use a plurality of nozzles, for example from 2 to 100 nozzles.

Preferred nozzles used are capillaries of diameter from 0.1 to 2 mm, in particular from 0.3 to 1 mm, with throughput of from 10 to 3000 g per hour of the solution (PL), in particular in the range from 400 to 2000 g per hour and per capillary or per nozzle. The pressure upstream of the capillary or nozzle is generally in the range from 0.1 to 8 bar, in particular in the range from 0.5 to 3 bar. In most cases it is sufficient that the container to which the solution (PL) has been charged is mounted at a somewhat higher level than the nozzle or capillary and that hydrostatic pressure is utilized. Step (II) of the invention produces droplets with a size in the range from 0.5 to 4 mm, preferably in the range from 1 to 3 mm, particularly preferably from 1.5 to 2 mm.

As described above, in step (II) the temperature of the solution (PL) is the main decisive factor, and the concentration of the polyaryl ether sulfone polymer (P) in the solution (PL) is a secondary decisive factor. The reference point selected here for the temperature and the concentration of the solution (PL) is preferably the discharge of the solution (PL) from the nozzle(s).

The present invention therefore also provides a process in which the solution (PL) provided in step (I) is introduced in step (II) into at least one nozzle and after discharge from the nozzle is separated by jet disintegration into droplets.

It is preferable that the temperature of the solution (PL) on discharge from the nozzle is in the range from 50 to <80° C., preferably in the range from 50 to 79° C., particularly preferably in the range from 50 to 78° C. and in particular in the range from 50 to 75° C. In another preferred embodiment, the solution (PL) comprises, on discharge from the nozzle, from 15 to 35% by weight, preferably from 15 to 30% by weight, of the polyaryl ether sulfone polymer (P), based on the total weight of the solution (PL).

(III) Transfer of the Droplets into a Precipitation Bath (F)

The droplets formed in step (II) are transferred in step (III) into a precipitation bath (F). The precipitation bath (F) comprises water and optionally alcohols (ROH) having from 1 to 8 carbon atoms. Examples of suitable alcohols are methanol, ethanol, propanol, isopropanol, n-butanol and butanol isomers, n-pentanol and pentanol isomers, and also n-hexanol and hexanol isomers.

It is preferable that the precipitation bath (F) comprises at least 50% by weight of water, based on the liquid constituents of the precipitation bath (F). The precipitation bath (F) particularly preferably comprises at least 70% by weight of water, more preferably at least 80% by weight of water and with particular preference at least 90% by weight of water, based in each case on the total weight of the liquid constituents of the precipitation bath (F).

The temperature of the precipitation bath (F) is generally in the range from 5 to 50° C., preferably from 5 to 35° C. and with particular preference from 10 to 30° C.

The polyaryl ether sulfone polymer (P) is not soluble in the precipitation bath (F). Polyaryl ether sulfone polymers (P) in the form of particles are therefore formed from the droplets formed in step (II). These polymer particles are generally of spherical shape. The average size of the polymer particles is generally in the range from 100 µm to 10 mm, preferably in the range from 300 µm to 5 mm and with particular preference in the range from 400 µm to 4 mm.

Steps (II) and (III) are generally carried out under atmospheric pressure. It is possible to carry out steps (II) and (III) under inert gas. Nitrogen or noble gases are suitable by way of example as inert gases, preference being given to argon.

(IV) Isolation of the Polyaryl Ether Sulfone Polymer (P) in the Form of Particles Step (III) gives the polyaryl ether sulfone polymer (P) in the form of particles. In step (IV) the polyaryl ether sulfone polymer (P) is isolated. It is preferable that the polyaryl ether sulfone polymer (P) is isolated in the form of particles in step (IV). The present invention therefore also provides a process for the production of polyaryl ether sulfone polymers (P) in the form of particles.

The isolation of the polyaryl ether sulfone polymer (P) here can be achieved directly from the precipitation bath (F). Processes for the isolation of polymers in the form of particles are known in principle to the person skilled in the art. The isolation of the polyaryl ether sulfone polymer (P) in the form of particles can be achieved by way of example by filtration or centrifuging.

In one preferred embodiment, the polyaryl ether sulfone polymer (P) obtained in step (III) is subjected to an extraction step prior to isolation according to step (IV). For this, the polyaryl ether sulfone polymer (P) in the form of particles obtained according to step (III) is transferred to an extraction stage. To this end, the polyaryl ether sulfone polymer (P) obtained according to step (III) can be isolated from the precipitation bath (F) and transferred to the extraction stage. It is also possible to use a moving precipitation bath (F). In this embodiment, the precipitation bath (F) used in step (III) simultaneously serves as means of transport. Here, the solvent of the precipitation bath (F) transports the polyaryl ether sulfone polymer (P) in the form of particles into the extraction stage.

In the extraction stage, the polyaryl ether sulfone polymer (P) is subjected to extraction by an extractant (E). It is preferable to use, as extractant (E) for this purpose, an extractant (E) which comprises water. It is preferable that the extractant (E) comprises at least 90% of water, particularly at least 95% of water, and in particular the extractant (E) consists of water. Water used is preferably demineralized water.

The temperature of the extractant (E) during extraction is preferably in the range from 50 to 100° C., with preference in the range from 80 to 90° C. The extraction of the polyaryl ether sulfone polymers (P) in the form of particles here can by way of example take place in countercurrent mode. The extraction of polymer particles is known in principle to the person skilled in the art and is described by way of example in EP 2 305 740 and DE 36 44 464.

After extraction, the extracted polyaryl ether sulfone polymer (P) in the form of particles is isolated according to step (IV). This can be achieved by way of example, as described above, by filtration or centrifuging. Preference is given to isolation by filtration.

The polyaryl ether sulfone polymer (P) isolated according to step (IV) can then be subjected to further work-up steps. It is preferable that the polyaryl ether sulfone polymer (P) obtained according to step (IV) is subjected to a drying step, in order to remove water comprised in the polyaryl ether sulfone polymers (P). The drying step here is preferably carried out at elevated temperatures, for example at temperatures in the range from 50 to 300° C., preferably in the range from 100 to 200° C. The drying can optionally be carried out under reduced pressure.

The drying step is generally carried out in this way until the water content of the polyaryl ether sulfone polymer (P) is less than 0.1% by weight, based on the total weight of the polyaryl ether sulfone polymer (P) in the form of particles.

Polyaryl Ether Sulfone Polymer (P)

Surprisingly, it has been found that the process of the invention gives polyaryl ether sulfone polymers (P) which have low content of aprotic polar solvents (L). The polyaryl ether sulfone polymers (P) obtainable by the process of the invention have less than 300 ppm by weight, preferably less than 250 ppm by weight, particularly preferably less than 150 ppm by weight, more preferably less than 100 ppm by weight and with particular preference less than 70 ppm by weight, of aprotic polar solvents (L), based in each case on the total weight of the polyaryl ether sulfone polymer (P). The polyaryl ether sulfone polymers (P) obtained in the invention generally have at least 1 ppm by weight, preferably at least 5 ppm by weight and particularly preferably at least 10 ppm by weight, content of aprotic polar solvent (L), based in each case on the total weight of the polyaryl ether sulfone polymer (P).

The polyaryl ether sulfone polymers (P) obtainable by the processes described in the prior art have markedly higher concentrations of aprotic polar solvent. Products obtainable commercially sometimes comprise residual content of aprotic polar solvent in the region of 2000 ppm by weight.

The present invention therefore also provides a polyaryl ether sulfone polymer (P) which has less than 300 ppm by weight, preferably less than 250 ppm by weight, particularly preferably less than 150 ppm by weight, more preferably less than 100 ppm by weight and with particular preference less than 70 ppm by weight content of aprotic polar solvent (L), based on the total weight of the polyaryl ether sulfone polymer (P).

The present invention also provides a polyaryl ether sulfone polymer (P) obtainable by the process of the invention.

The present invention also provides a polyaryl ether sulfone polymer (P) obtainable by the process of the invention, where the solution (PL) provided in step (I) comprises sulfolane as aprotic polar solvent (L).

The present invention also provides a polyaryl ether sulfone polymer (P) obtainable by the process of the invention, where the aprotic polar solvent (L) in step (I) comprises sulfolane.

It is preferable that the aprotic polar solvent (L) in step (I) comprises at least 60% by weight of sulfolane, particularly at least 80% by weight of sulfolane, more preferably at least 90% by weight of sulfolane, and in particular at least 95% by weight of sulfolane, based in each case on the total weight of the aprotic polar solvent (L). It is most preferable that the aprotic polar solvent (L) consists of sulfolane.

The present invention therefore also provides a polyaryl ether sulfone polymer (P) which has less than 300 ppm by weight, preferably less than 250 ppm by weight, particularly preferably less than 150 ppm by weight, more preferably less than 100 ppm by weight, and with particular preference less than 70 ppm by weight content of sulfolane, based on the total weight of the polyaryl ether sulfone polymer (P).

The present invention therefore also provides a polyaryl ether sulfone polymer (P) obtainable by the process of the invention which has less than 300 ppm by weight, preferably less than 250 ppm by weight, particularly preferably less than 150 ppm by weight, more preferably less than 100 ppm by weight, and with particular preference less than 70 ppm by weight content of sulfolane, based on the total weight of the polyaryl ether sulfone polymer (P).

The above statements and preferences relating to the process for producing the polyaryl ether sulfone polymer (P) apply correspondingly to the polymer itself.

Preference is accordingly given to polybiphenyl sulfone polymers (P1). Surprisingly, it has also been found that when the provision of the solution (PL) takes place via the steps (i), (ii) and, respectively, (iii), the polyaryl ether sulfone polymers (P) obtained have low content of polymer-bonded chlorine.

The present invention also provides polyaryl ether sulfone polymers (P) which are obtainable according to the process of the invention, and also polyaryl ether sulfone polymers (P) with less than 400 ppm by weight content of polymer-bonded chlorine, in particular less than 300 ppm by weight, particularly preferably less than 200 ppm by weight, based in each case on the total weight of the polyaryl ether sulfone polymer (P).

The polyaryl ether sulfone polymers (P) of the invention preferably have less than 400 ppm by weight content of polymer-bonded chlorine, particularly preferably less than 300 ppm by weight, and with particular preference less than 200 ppm by weight. The lower limit of content of polymer-bonded chlorine is usually, by virtue of the process, at least 10 ppm by weight, in particular at least 20 ppm by weight, based in each case on the total weight of the polyaryl ether sulfone polymer (P).

The chlorine content of the polyaryl ether sulfone polymer (P) obtainable corresponds to the content of terminal chlorine groups and for the purposes of the present invention is determined by means of atomic spectroscopy. For the purposes of the present invention, the content of polymer-bonded chlorine is based in principle on the proportion by weight, and can alternatively be stated in mg per kg of the polyaryl ether sulfone polymer (P).

The polyaryl ether sulfone polymers (P) which are obtainable by the process of the invention particularly preferably have less than 400 ppm by weight content of polymer-bonded chlorine and at the same time a proportion of less than 300 ppm by weight of residual solvent, based in each case on the total weight of the polyaryl ether sulfone polymer (P).

The polyaryl ether sulfone polymers (P) of the invention moreover feature a tensile strain at break of more than 50% in the tensile test.

The present invention also provides thermoplastic molding compositions comprising the polyaryl ether sulfone polymer (P) of the invention.

The thermoplastic molding compositions of the present invention can comprise not only the polyaryl ether sulfone polymer (P) of the invention but also at least one polymer selected from polyaryl ether sulfones (other than the polyaryl ether sulfone polymers (P) of the invention), in particular polyether sulfone (PES) and/or polysulfone (PSU), and also polyetherimides, polyphenylene sulfides, polyether ether ketones, polyimides or poly-p-phenylenes.

The molding compositions of the invention can moreover comprise fillers, in particular fibers, particularly preferably glass fibers. Appropriate fillers are known to the person skilled in the art.

To the extent that fillers are used, the amount of these preferably then added is from 5 to 150 parts by weight, based on 100 parts by weight of polymer.

The thermoplastic molding compositions of the invention can in particular comprise any of the glass fibers that are known to the person skilled in the art and that are suitable for use in thermoplastic molding compositions. These glass fibers can be produced by processes known to the person skilled in the art and can optionally be surface-treated. The glass fibers can be equipped with a size in order to improve compatibility with the matrix material, for example as described in DE 10117715.

One preferred embodiment uses glass fibers with a diameter of from 5 to 15 μm, preferably from 7 to 13 μm, particularly preferably from 9 to 11 μm.

Another embodiment uses glass fibers of diameters from 5 to 20 μm.

The glass fibers incorporated can take the form either of chopped glass fibers or else of continuous filament strands (rovings). The length of the glass fibers that can be used is generally typically from 4 to 5 mm prior to incorporation in the form of chopped glass fibers into the thermoplastic molding composition. After the processing of the glass fibers, for example by extrusion, with the other components, the average length of the glass fibers present is usually from 100 to 400 μm, preferably from 200 to 350 μm.

The molding compositions of the invention can comprise, as further component K, auxiliaries, in particular processing aids, pigments, stabilizers, flame retardants or mixtures of various additives. Examples of other conventional added substances are oxidation retarders, agents to counter decomposition by heat and decomposition by ultraviolet light, lubricants and mold-release agents, dyes, and plasticizers.

The proportion of further components K in the molding compositions of the invention is in particular from 0 up to 30% by weight, preferably from 0 up to 20% by weight, in particular from 0 to 15% by weight, based on the total weight of the thermoplastic molding composition.

In the event that component K comprises stabilizers, the proportion of said stabilizers is usually up to 2% by weight, preferably from 0.01 to 1% by weight, in particular from 0.01 to 0.5% by weight, based on the total weight of the thermoplastic molding composition.

The amounts generally comprised of pigments and dyes are from 0 to 10% by weight, preferably from 0.05 to 7% by weight, and in particular from 0.1 to 5% by weight, based on the total weight of the thermoplastic molding composition.

Pigments for the coloring of thermoplastics are well known—see for example R. Gächter and H. Müller, Taschenbuch der Kunststoffadditive [Plastics additives handbook], Carl Hanser Verlag, 1983, pages 494 to 510. A first preferred group of pigments that may be mentioned are white pigments, such as zinc oxide, zinc sulfide, white lead [2 $PbCO_3.Pb(OH)_2$], lithopones, antimony white, and titanium dioxide. Of the two most familiar crystalline forms of titanium dioxide (rutile and anatase), it is in particular the rutile form which is used for white coloring of the molding compositions of the invention. Black color pigments which can be used according to the invention are iron oxide black ($Fe_3O_4$), spinel black [$Cu(Cr,Fe)_2O_4$], manganese black (a mixture composed of manganese dioxide, silicon dioxide, and iron oxide), cobalt black, and antimony black, and also particularly preferably carbon black, which is mostly used in the form of furnace black or gas black. In this connection see G. Benzing, Pigmente für Anstrichmittel [Pigments for paints], Expert-Verlag (1988), pages 78 ff.

Particular color shades can be achieved by using inorganic chromatic pigments, such as chromium oxide green, or organic chromatic pigments, such as azo pigments or phthalocyanines. Pigments of this type are generally commercially available.

Examples of oxidation retarders and heat stabilizers which can be added to the thermoplastic compositions according to the invention are halides of metals of group I of the Periodic Table of the Elements, e.g. sodium halides, potassium halides, or lithium halides, examples being chlorides, bromides, or iodides. Zinc fluoride and zinc chloride can moreover be used. It is also possible to use sterically hindered phenols, hydroquinones, substituted representatives of this group, secondary aromatic amines, optionally in combination with phosphorus-containing acids, or to use their salts, or a mixture of said compounds, preferably in concentrations up to 1% by weight, based on the total weight of the thermoplastic molding composition.

Examples of UV stabilizers are various substituted resorcinols, salicylates, benzotriazoles, and benzophenones, the amounts generally used of these being up to 2% by weight.

Lubricants and mold-release agents, the amounts of which added are generally up to 1% by weight, based on the total weight of the thermoplastic molding composition, are stearyl alcohol, alkyl stearates and stearamides, and also esters of pentaerythritol with long-chain fatty acids. It is also possible to use dialkyl ketones, such as distearyl ketone.

The molding compositions of the invention comprise, as preferred constituent, from 0.1 to 2% by weight, preferably from 0.1 to 1.75% by weight, particularly preferably from 0.1 to 1.5% by weight, and in particular from 0.1 to 0.9% by weight (based on the total weight of the thermoplastic molding composition) of stearic acid and/or stearates. Other stearic acid derivatives can in principle also be used, examples being esters of stearic acid.

Stearic acid is preferably produced via hydrolysis of fats. The products then obtained are usually mixtures composed of stearic acid and palmitic acid. These products therefore have a wide softening range, for example from 50 to 70° C., as a function of the constitution of the product. Preference is given to use of products with more than 20% by weight content of stearic acid, particularly preferably more than 25% by weight. It is also possible to use pure stearic acid (>98%).

The molding compositions of the invention can moreover also comprise stearates. Stearates can be produced either via reaction of corresponding sodium salts with metal salt solutions (e.g. $CaCl_2$, $MgCl_2$, aluminum salts) or via direct reaction of the fatty acid with metal hydroxide (see for example Baerlocher Additives, 2005). It is preferable to use aluminum tristearate.

The constituents of the thermoplastic molding composition of the invention can be mixed in any desired sequence.

The molding compositions used in the invention can be produced by processes known per se, for example by extrusion. The molding compositions can by way of example be produced by mixing the starting components in conventional mixing apparatuses, such as screw-based extruders, preferably twin-screw extruders, Brabender mixers or Banbury mixers, or else kneaders, and then extruding same. Once produced, the extrudate is cooled and comminuted. The sequence of mixing of the components can be varied, and it is therefore possible to premix two or optionally three components, or else to mix all of the components together.

Intensive mixing is advantageous in order to obtain maximum homogeneity of mixing. Average mixing times necessary for this are generally from 0.2 to 30 minutes at temperatures of from 280 to 380° C., preferably from 290 to 370° C. Once produced, the extrudate is generally cooled and comminuted.

The molding compositions used in the invention feature good flowability, high toughness, and little intrinsic color. The molding compositions of the invention are therefore suitable for the production of moldings for household items, and electrical or electronic components, and also for moldings for the vehicle sector.

The thermoplastic molding compositions of the invention can be used advantageously for the production of moldings, fibers, films, membranes, or foams. The present invention also provides moldings, fibers, films, membranes and foams comprising the thermoplastic molding compositions of the invention.

The examples below illustrate, but do not restrict, the invention.

EXAMPLES

The intrinsic viscosity of the polyaryl ether sulfone polymers (P) is determined in 1% N-methylpyrrolidone solution at 25° C.

The polyaryl ether sulfone polymers (P) were isolated by dropletization of a solution (PL), the temperature of which was controlled by way of a thermostat. The precipitation bath (F) used comprised demineralized water (20° C.) (drop height 0.5 m, throughput about 2.5 L/h). The resultant polyaryl ether sulfone polymers (P) were then extracted with water at 85° C. for 20 h (water throughput 160 L/h). The polyaryl ether sulfone polymers (P) in the form of particles were afterward dried at 150° C. to a residual moisture level of less than 0.1% by weight.

The volume-average particle size of the potassium carbonate used was determined by using a Malvern Mastersizer 2000 on a suspension of the particles in chlorobenzene/sulfolane (60/40).

The sulfolane content of the polyaryl ether sulfone polymers (P) in the form of particles was determined by means of 1H NMR after calibration. The sulfolane signals at 2.2 and 3.1 ppm were used here.

Die resultant polyaryl ether sulfone polymers (P) were pelletized at melt temperature 370° C. in a twin-screw extruder (PTW 18). Processing to give test specimens took place at 375° C. melt temperature and 160° C. mold temperature.

The intrinsic color of the polyaryl ether sulfone polymers (P) was determined by measuring the Yellowness Index (YI) (ASTM D1925) of injection-molded plaques of thickness 2 mm (375° C. melt temperature; 160° C. mold temperature).

The Cl content (polymer-bonded chlorine) of the specimens was determined by atomic spectroscopy.

The purity of the monomers used (4,4'-dichlorodiphenyl sulfone, 4,4'-dihydroxybiphenyl) was more than 99.5%.

The D[4,3] particle size of the potassium carbonate used was 30.2 μm.

Solution 1

Polyaryl ether sulfone polymers (P), obtained by nucleophilic aromatic polycondensation of 574.30 g (2.000 mol) of 4,4'-dichlorodiphenyl sulfone, 372.40 g (2.000 mol) of 4,4'-dihydroxybiphenyl, in the presence of 290.24 g (2.10 mol) of potassium carbonate (particle size 30.2 μm) in 1538 ml of sulfolane. This mixture is kept at 210° C. for 1 hour. The mixture is then diluted by addition of 500 ml of sulfolane. The suspension was then reacted with methyl chloride (15 L/h) at 180° C. for 30 minutes. The suspension is then diluted with 1300 ml of sulfolane previously heated to 100° C., and is transferred to a heated pressure filter (120° C.).

The solution (PL) is filtered into a container heated to 80° C.

The solution (PL) is pumped from said container into a nozzle in such a way as to produce small droplets, which drop into a stirred container comprising the precipitation bath (F) (water). Polyaryl ether sulfone polymer (P) in the form of particles (beads) is thus produced and, after isolation, was extracted for 20 h with water heated to 85° C. (160 L/h). After drip-drying to remove the water, the beads are dried at 150° C. in a drying oven to a residual moisture level <0.1% by weight.

The temperature of the solution (PL) during dropletization was varied. The values measured during characterization are listed in table 1.

Solution 2

Polyaryl ether sulfone polymers (P), obtained by nucleophilic aromatic polycondensation of 574.30 g (2.000 mol) of 4,4'-dichlorodiphenyl sulfone, 379.87 g (2.040 mol) of 4,4'-dihydroxybiphenyl, in the presence of 290.24 g (2.10 mol) of potassium carbonate (particle size 30.2 µm) in 1538 ml of sulfolane. This mixture is kept at 210° C. for 2 hours. The mixture is then diluted by addition of 500 ml of sulfolane. The suspension was then reacted with methyl chloride (15 L/h) at 180° C. for 30 minutes. The suspension is then diluted with 1300 ml of sulfolane previously heated to 100° C., and is transferred to a heated pressure filter (120° C.). The solution (PL) is filtered into a container heated to 80° C.

The solution (PL) is pumped from said container into a nozzle in such a way as to produce small droplets, which drop into a stirred container comprising the precipitation bath (F) (water). Polyaryl ether sulfone polymer (P) in the form of particles (beads) is thus produced and, after isolation, was extracted for 20 h with water heated to 85° C. (160 L/h). After drip-drying to remove the water, the beads are dried at 150° C. in a drying oven to a residual moisture level <0.1% by weight.

The temperature of the solution (PL) during dropletization was varied. The values measured during characterization are listed in table 1.

Solution 3

Polyaryl ether sulfone polymers (P), obtained by nucleophilic aromatic polycondensation of 574.30 g (2.000 mol) of 4,4'-dichlorodiphenyl sulfone, 379.87 g (2.040 mol) of 4,4'-dihydroxybiphenyl, in the presence of 290.24 g (2.10 mol) of potassium carbonate (particle size 30.2 µm) in 1538 ml of sulfolane. This mixture is kept at 210° C. for 2 hours. A mixture of 100 ml of sulfolane/0.78 g of NaOH/0.78 ml of demineralized water was then added, and the mixture was stirred for a further 30 minutes. The mixture is then diluted by addition of 500 ml of sulfolane. The suspension was then reacted with methyl chloride (15 Uh) at 180° C. for 30 minutes. The suspension is then diluted with 1300 ml of sulfolane previously heated to 100° C., and is transferred to a heated pressure filter (120° C.). The solution (PL) is filtered into a container heated to 80° C.

The solution (PL) is pumped from said container into a nozzle in such a way as to produce small droplets, which drop into a stirred container comprising the precipitation bath (F) (water). Polyaryl ether sulfone polymer (P) in the form of particles (beads) is thus produced and, after isolation, was extracted for 20 h with water heated to 85° C. (160 L/h). After drip-drying to remove the water, the beads were dried at 150° C. in a drying oven to a residual moisture level <0.1% by weight.

The temperature of the solution (PL) during dropletization was varied. The values measured during characterization are listed in table 1.

Solution 4

Polyaryl ether sulfone polymer (P), obtained by nucleophilic aromatic polycondensation of 586.75 g (2.044 mol) of 4,4'-dichlorodiphenyl sulfone and 372.42 g (2.00 mol) of 4,4'-dihydroxybiphenyl, in the presence of 286.09 g (2.07 mol) of potassium carbonate (particle size 61 µm) in 2100 ml of NMP. This mixture is kept at 190° C. for 6 hours. The mixture is then diluted by addition of 1200 ml of NMP. The suspension was then reacted with methyl chloride (15 l/h) at 130° C. for 1 hour. After cooling to 80° C. the suspension is discharged and the solid constituents are removed by filtration to give the solution (PL).

The solution (PL) is pumped from said container into a nozzle in such a way as to produce small droplets, which drop into a stirred container comprising the precipitation bath (F) (water). Polyaryl ether sulfone polymer (P) in the form of particles (beads) is thus produced and, after isolation, was extracted for 20 h with water heated to 85° C. (160 L/h). After drip-drying to remove the water, the beads were dried at 150° C. in a drying oven to a residual moisture level <0.1% by weight.

The temperature of the solution during dropletization was varied. The values measured during characterization are listed in table 1.

Solution 5

Polyaryl ether sulfone polymer (P), obtained by nucleophilic aromatic polycondensation of 574.30 g (2.00 mol) of 4,4'-dichlorodiphenyl sulfone and 500.56 g (2.00 mol) of 4,4'-dihydroxydiphenyl sulfone, in the presence of 286.09 g (2.07 mol) of potassium carbonate (particle size 30 µm) in 2100 ml of NEP.

This mixture is kept at 190° C. for 6 hours. The mixture is then diluted by addition of 1200 ml of NEP. The suspension was then reacted with methyl chloride (15 l/h) at 130° C. for 1 hour. After cooling to 80° C. the suspension is discharged and the solid constituents are removed by filtration to give the solution (PL).

The solution (PL) is pumped from said container into a nozzle in such a way as to produce small droplets, which drop into a stirred container comprising water. Polyaryl ether sulfone polymer (P) in the form of particles (beads) is thus produced and, after isolation, was extracted for 20 h with water heated to 85° C. (160 L/h). After drip-drying to remove the water, the beads were dried at 150° C. in a drying oven to a residual moisture level <0.1% by weight.

The temperature of the solution during dropletization was varied. The values measured during characterization are listed in table 1.

TABLE 1

| Experiment | 1 | comp. 2 | comp. 3 | 4 | 5 | comp. 6 | comp. 7 | 8 |
|---|---|---|---|---|---|---|---|---|
| Solution (PL) | 1 | 1 | 1 | 1 | 2 | 2 | 2 | 2 |
| Temperature of solution (PL) during dropletization [° C.] | 60 | 45 | 85 | 75 | 60 | 45 | 85 | 75 |

TABLE 1-continued

| Experiment | | | | | | | | |
|---|---|---|---|---|---|---|---|---|
| Concentration [% by wt.] | 19.2 | 19.2 | 19.2 | 19.2 | 19.2 | 19.2 | 19.2 | 19.2 |
| Cl content [ppm] | 2150 | 2160 | 2130 | 2120 | 530 | 510 | 540 | 520 |
| Solvent content (L) [ppm] | 90 | 250 | 340 | 80 | 80 | 340 | 350 | 70 |
| YI | 67 | — | — | — | 56 | — | — | — |

| Experiment | 9 | comp. 10 | comp. 11 | 12 | 13 | 14 | 15 |
|---|---|---|---|---|---|---|---|
| Solution (PL) | 3 | 3 | 3 | 3 | 3 | 3 | 3 |
| Temperature of solution (PL) during dropletization [° C.] | 60 | 45 | 85 | 75 | 60 | 60 | 60 |
| Concentration [% by wt.] | 19.2 | 19.2 | 19.2 | 19.2 | 14 | 12 | 16 |
| Cl content [ppm] | 150 | 140 | 150 | 150 | 150 | 140 | 150 |
| Solvent content (L) [ppm] | 80 | 360 | 370 | 80 | 230 | 190 | 90 |
| YI | 26 | — | — | — | — | — | — |

| Experiment | 16 | 17 | comp. 18 | comp. 19 | 20 | comp. 21 | comp. 22 |
|---|---|---|---|---|---|---|---|
| Solution (PL) | 4 | 4 | 4 | 4 | 5 | 5 | 5 |
| Temperature of solution (PL) during dropletization [° C.] | 60 | 75 | 85 | 45 | 60 | 85 | 45 |
| Concentration [% by wt.] | 19.2 | 19.2 | 19.2 | 19.2 | 19.2 | 19.2 | 19.2 |
| Cl content [ppm] | 2910 | 2890 | 2900 | 2910 | 1370 | 1390 | 1380 |
| Solvent content (L) [ppm] | 110 | 100 | 250 | 240 | 95 | 320 | 340 |
| YI | — | — | — | — | — | — | — |

Comparative values for Radel ® R-5000 are:
Cl content [ppm]    2900
Solvent content (L) [ppm]    2000
YI    67

The molding compositions of the invention feature a combination of very low Cl content, low sulfolane content and good intrinsic color.

The invention claimed is:

1. A process for the production of a polyaryl ether sulfone polymer (P), the process comprising:
   (I) providing a solution (PL) which comprises polyaryl ether sulfone polymer (P) and comprises an aprotic polar solvent (L),
   (II) separating the solution (PL) into droplets,
   (III) transferring the droplets into a precipitation bath (F) which comprises water, thereby obtaining the polyaryl ether sulfone polymer (P) in the form of particles, and
   (IV) isolating polyaryl ether sulfone polymer (P),
   wherein the temperature of the solution (PL), which is separated into droplets prior to transferring into a precipitation bath, is in the range from 50 to less than 80° C.

2. The process according to claim 1, wherein the solution (PL) comprises from 10 to 35% by weight of the polyaryl ether sulfone polymer (P) based on the total weight of the solution (PL).

3. The process according to claim 1, wherein the temperature of the precipitation bath (F) ranges from 5 to 50° C.

4. The process according to claim 1, wherein the aprotic polar solvent (L) is at least one solvent with a boiling point in a range of from 100 to 280° C., selected from the group consisting of ethers, esters, ketones, asymmetrically halogenated hydrocarbons, anisole, dimethylformamide, dimethyl sulfoxide, N-ethyl-2-pyrrolidone, N-methyl-2-pyrrolidone, and tetrahydrothiophene 1,1-dioxide.

5. The process according to claim 1, wherein the aprotic polar solvent (L) is at least one solvent selected from the group consisting of dimethyl sulfoxide, sulfolane, N-ethyl-2-pyrrolidone and N-methyl-2-pyrrolidone.

6. The process according to claim 1, wherein the provision of the solution (PL) according to (I) comprises:
   (i) the reaction of a component (a1), composed of at least one aromatic dihydroxy compound, and of component (a2), composed of at least one aromatic sulfone compound having two halogen substituents, where component (a1) comprises 4,4'-dihydroxybiphenyl and where the molar ratio of components (a1) to (a2) is in the range from 1.005 to 1.2, and where the reaction is carried out in an aprotic polar solvent (L) in the presence of a carbonate compound (C), with the result that the solution (PL) is obtained.

7. The process according to claim 6, wherein component (a1) comprises at least 50% by weight of 4,4'-dihydroxybiphenol.

8. The process according to claim 6, wherein component (a2) is at least one dihalodiphenyl sulfone selected from the group consisting of 4,4'-dichlorodiphenyl sulfone, 4,4'-difluorodiphenyl sulfone, 4,4'-dibromodiphenyl sulfone, 2,2'-dichlorodiphenyl sulfone and 2,2'-difluorodiphenyl sulfone.

9. The process according to claim 6, wherein the provision of the solution (PL) according to (I) comprises:
   (i) the reaction of a component (a1), composed of at least one aromatic dihydroxy compound, and of component (a2), composed of at least one aromatic sulfone compound having two halogen substituents, where component (a1) comprises 4,4'-dihydroxybiphenyl and where the molar ratio of components (a1) to (a2) is in the range from 1.005 to 1.2, and where the reaction is carried out in an aprotic polar solvent (L) in the presence of a carbonate compound (C), with the result that a polymer (Pr) is obtained, and
   (ii) reaction of the polymer (Pr) with an alkyl chloride with the result that the solution (PL) is obtained.

10. The process according to claim 1, wherein the solution provided in (I) (PL) is introduced in (II) into at least one nozzle and, after discharge from the nozzle, is separated into droplets via disintegration by a jet.

11. The process according to claim 1, wherein the aprotic polar solvent (L) comprises sulfolane.

12. The process according to claim 1, further comprising stirring the precipitation bath (F) when transferring the droplets into the precipitation bath (F).

13. The process according to claim 6, wherein the solution (PL) has a temperature of from 50 to less than 80° C. after the reaction.

14. The process according to claim 6, wherein the solution (PL) has a temperature of at least 80° C. after the reaction, and wherein the process further comprises cooling the solution (PL) by adding further aprotic polar solvent (L) after the reaction, thereby obtaining the solution (PL) having a temperature of from 50 to less than 80° before separating the solution into droplets.

15. A process for the production of a polyaryl ether sulfone polymer (P), the process comprising:
- (I) providing a solution (PL) which comprises polyaryl ether sulfone polymer (P) and comprises an aprotic polar solvent (L),
- (II) separating the solution (PL) into droplets,
- (III) transferring the droplets into a precipitation bath (F) which comprises water, thereby obtaining the polyaryl ether sulfone polymer (P) in the form of particles, and
- (IV) isolating polyaryl ether sulfone polymer (P),
- wherein the temperature of the solution (PL), which is separated into droplets prior to transferring into a precipitation bath, is in the range from 50 to less than 80° C., and
- wherein the polyaryl ether sulfone polymer (P) isolated in (IV) has a content of 230 ppm or less of the aprotic polar solvent (L).

* * * * *